(12) United States Patent
Ripper et al.

(10) Patent No.: US 7,059,117 B2
(45) Date of Patent: Jun. 13, 2006

(54) METHOD AND DEVICE FOR CONTROLLING AN EXHAUST TREATMENT SYSTEM

(75) Inventors: Wolfgang Ripper, Stuttgart (DE); Bernd Mahr, Plochingen (DE); Rainer Strohmaier, Stuttgart (DE)

(73) Assignee: Robert Bosh GmbH, Stuttgart (DE)

( * ) Notice: Subject to any disclaimer, the term of this patent is extended or adjusted under 35 U.S.C. 154(b) by 4 days.

(21) Appl. No.: 10/250,872

(22) PCT Filed: Dec. 22, 2001

(86) PCT No.: PCT/DE01/04922

§ 371 (c)(1),
(2), (4) Date: Jan. 20, 2004

(87) PCT Pub. No.: WO02/053887

PCT Pub. Date: Jul. 11, 2002

(65) Prior Publication Data

US 2004/0118108 A1    Jun. 24, 2004

(30) Foreign Application Priority Data

Jan. 8, 2001    (DE) .............................. 101 00 419

(51) Int. Cl.
*F01N 3/00*    (2006.01)
(52) U.S. Cl. ............................ 60/286; 60/274; 60/276; 60/285; 60/303

(58) Field of Classification Search .................. 60/274, 60/276, 285, 286, 295, 297, 301, 303
See application file for complete search history.

(56) References Cited

U.S. PATENT DOCUMENTS

| 5,207,990 | A | * | 5/1993 | Sekiya et al. ................ 422/183 |
| 5,711,149 | A | * | 1/1998 | Araki ........................... 60/278 |
| 5,716,586 | A | * | 2/1998 | Taniguchi .................... 422/173 |
| 6,167,698 | B1 |  | 1/2001 | King et al. |
| 6,405,528 | B1 | * | 6/2002 | Christen et al. ............... 60/295 |
| 6,598,387 | B1 | * | 7/2003 | Carberry et al. .............. 60/297 |
| 6,751,949 | B1 | * | 6/2004 | Tamura et al. ................ 60/284 |

FOREIGN PATENT DOCUMENTS

| DE | 43 15 278 | 11/1994 |
| DE | 198 07 935 | 8/1999 |
| DE | 199 03 439 | 8/2000 |
| JP | 55-93917 | 7/1980 |

OTHER PUBLICATIONS

Patent Abstract of Japan, vol. 4, No. 139 (M-034), Sep. 30, 1980 (JP 55 093917, (UNITIKA LTD.), Jul. 16, 1980).

* cited by examiner

*Primary Examiner*—Binh Q. Tran
(74) *Attorney, Agent, or Firm*—Kenyon & Kenyon

(57) ABSTRACT

A device and a method for controlling an exhaust-gas aftertreatment system, for example, for an internal combustion engine, are provided. The exhaust-gas aftertreatment system includes at least one catalytic converter. A reducing agent is supplied to the exhaust-gas aftertreatment system. An exhaust gas mass flow is preselectable on the basis of the power consumption by a sensor and/or on the basis of a pressure variable.

7 Claims, 3 Drawing Sheets

METHOD AND DEVICE FOR CONTROLLING AN EXHAUST TREATMENT SYSTEM

FIELD OF THE INVENTION

The present invention relates to a method and a device for controlling an exhaust-gas aftertreatment system.

BACKGROUND INFORMATION

German Patent 199 03 439 discloses a method and a device for controlling an exhaust-gas aftertreatment system, whereby the exhaust-gas aftertreatment system includes at least one catalytic converter, in which nitrogen oxides are reduced by a reducing agent. To do so, a reducing agent is supplied to the exhaust-gas aftertreatment system and/or to exhaust gases upstream from the exhaust-gas aftertreatment system. The quantity of reducing agent is determined on the basis of the mass flow of the nitrogen oxides. The nitrogen oxide mass flow is in turn calculated on the basis of the rotational speed and/or the amount of fuel injected.

SUMMARY OF THE INVENTION

Due to the fact that the exhaust gas mass flow is preselectable on the basis of the power consumption of a sensor and/or on the basis of a pressure variable, this permits a much more accurate control of the exhaust-gas aftertreatment system, which results in a great decline in emissions.

A particularly accurate means of preselecting the nitrogen oxide mass flow in the exhaust gas upstream from the catalytic converter is obtained when, based on the exhaust gas mass flow and a second variable, which characterizes a nitrogen concentration in the exhaust gas upstream from the catalytic converter, a first variable, which characterizes a nitrogen oxide mass flow in the exhaust gas upstream from the catalytic converter is preselectable. This means that the nitrogen oxide mass flow is calculated on the basis of the exhaust gas mass flow and the nitrogen concentration in the exhaust gas.

This second variable may be detected by the sensor. This permits a significant reduction in sensor complexity. Thus, the sensor functions both to detect the nitrogen concentration in the exhaust gas and also to detect the exhaust gas mass flow. The sensor for detecting the nitrogen concentration in the exhaust gas is also used to determine the exhaust gas mass flow. This sensor functions like known air flow sensors which are also normally referred to as hot-film air mass meters or hot-wire air mass meters.

If the quantity of reducing agent to be supplied to the exhaust-gas aftertreatment system is determined on the basis of at least the first variable, a simple and inexpensive determination of the quantity of reducing agent is possible. The nitrogen oxide mass flow calculated on the basis of the exhaust gas mass flow and the nitrogen oxide concentration in the exhaust gas may be used to determine the quantity of reducing agent to be used, because this procedure yields much more accurate values than the known methods.

In a first exemplary embodiment of the present invention, the exhaust gas mass flow is determined on the basis of a first temperature variable, which characterizes the temperature of the exhaust gas, in particular upstream from the catalytic converter, and the power consumption by the sensor.

In a second exemplary embodiment of the present invention, the exhaust gas mass flow is determined based on at least the pressure variable and/or the first temperature variable.

In addition, implementations may also be in the form of a computer program having program code means and in the form of a computer program product having program code means. The computer program according to an exemplary embodiment of the present invention has program code means for performing all the steps of the method according to the present invention when the program is executed on a computer, for example, a control unit for an internal combustion engine of a motor vehicle. An exemplary embodiment of the present invention is implemented by a program stored in the control unit, so that this control unit, equipped with the program, constitutes the present invention in the same way as does the method for whose execution the program is suitable. The computer program product according to an exemplary embodiment of the present invention has program code means stored in a computer-readable data medium for executing the method according to the present invention when this program product is run on a computer, for example, a control unit for an internal combustion engine of a motor vehicle. Thus, in this case, an exemplary embodiment of the present invention is implemented by a data medium, so that the method according to the present invention may be executed when the program product and/or the data medium is integrated into a control unit, for example, of an internal combustion engine of a motor vehicle. The data medium and/or the computer program product may be an electric memory medium, e.g., a read-only memory (ROM), an EPROM or a permanent electric memory such as a CD-ROM or DVD.

DETAILED DESCRIPTION

Figure 1:
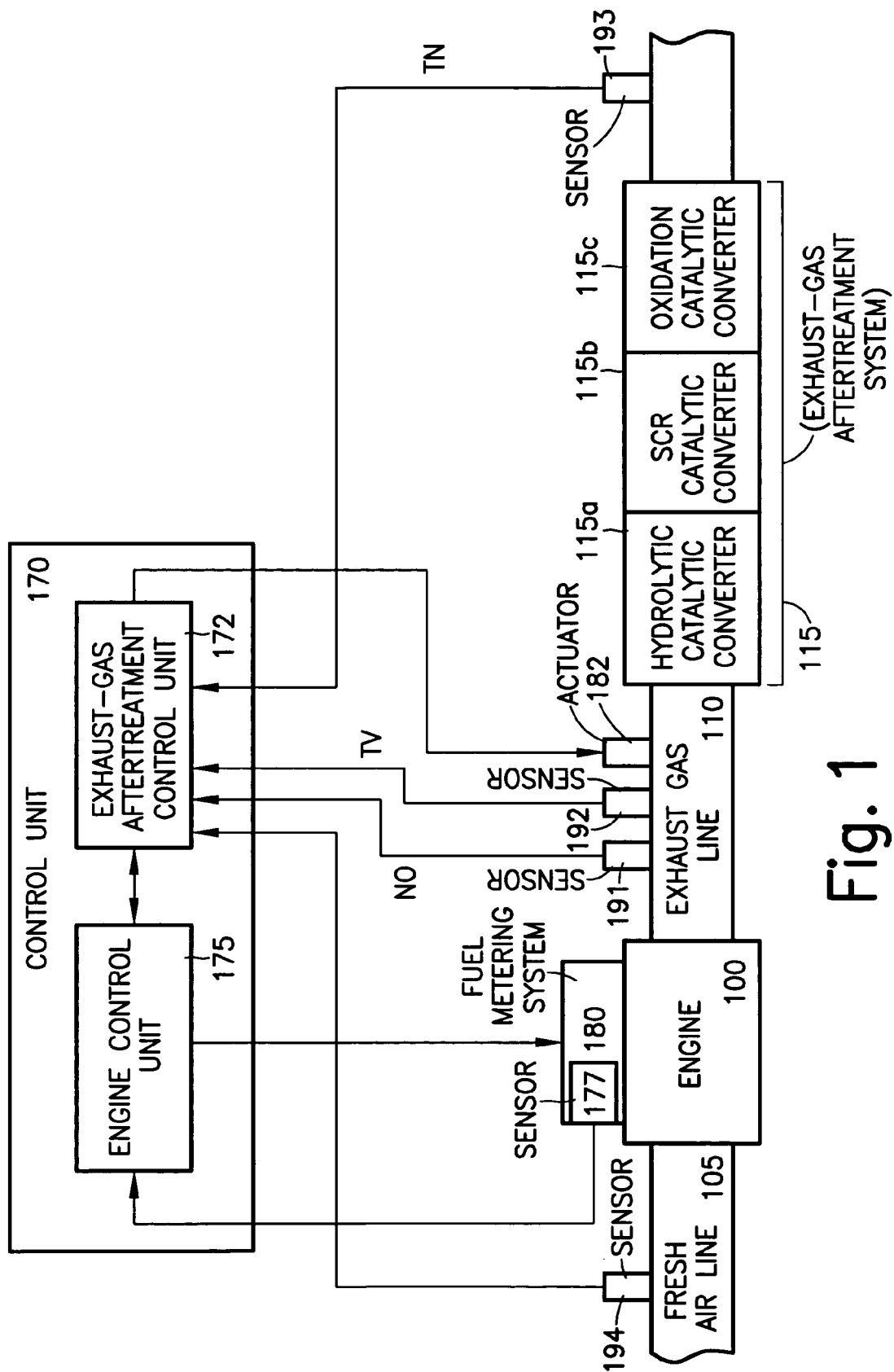
FIG. 1 shows a schematic block diagram of an exemplary embodiment of a device for controlling an exhaust-gas aftertreatment system.

FIG. 1 shows the essential elements of an exhaust-gas aftertreatment system of an internal combustion engine. Internal combustion engine 100 receives fresh air through a fresh air line 105. Exhaust gases from internal combustion engine 100 enter the environment through an exhaust gas line 110. An exhaust-gas aftertreatment system 115 is provided in the exhaust gas line. In the exemplary embodiment illustrated here, this is a catalytic converter. In addition, it is possible for multiple catalytic converters to be provided for different emissions or for combinations of at least one catalytic converter and a particle filter to be used.

In an exemplary embodiment, exhaust-gas aftertreatment system 115 includes one catalytic converter or three catalytic converters in which three reactions may take place. In a first hydrolytic catalytic converter 115a, the aqueous urea solution supplied with control element 182 is converted to ammonia $NH_3$. The actual reaction takes place in downstream SCR catalytic converter 115b, where nitrogen oxides and ammonia react to form nitrogen and water. Unconsumed ammonia is oxidized in downstream oxidative catalytic converter 115c.

In alternative exemplary embodiments in which other reducing agents are used, other catalytic converters may also be used.

In addition, a control unit 170 including at least one engine control unit 175 and an exhaust-gas aftertreatment control unit 172 is also provided. Engine control unit 175 sends triggering signals to a fuel metering system 180. Exhaust-gas aftertreatment control unit 172 sends signals to an actuator element 182 situated in the exhaust gas line upstream from or in the exhaust-gas aftertreatment system. Furthermore, exhaust-gas aftertreatment system 172 and engine control unit 175 exchange information, i.e., data.

In addition, different sensors which supply signals to the exhaust-gas aftertreatment control unit and the engine control unit may also be provided. Thus, at least one first sensor 194 may be provided to supply signals characterizing the state of the air supplied to the internal combustion engine. A second sensor 177 supplies signals characterizing the state of fuel metering system 180.

A sensor 191 may detect a nitrogen oxide concentration, also referred to as the second variable. A fourth sensor 192 may detect a temperature variable TV, which is also referred to as the temperature upstream from the exhaust-gas aftertreatment system. A fifth sensor 193 detects a temperature variable TN, which is also referred to as the temperature downstream from the exhaust-gas aftertreatment system. In another exemplary embodiment, a differential pressure sensor may also be provided, detecting a pressure variable, which characterizes the pressure difference between the inlet and the outlet of the exhaust-gas aftertreatment system.

Exhaust-gas aftertreatment control unit 172 may receive the output signals of first sensors 194, third sensor 191, fourth sensor 192 and fifth sensor 193. Engine control unit 175 may receive the output signals of second sensor 177. Other sensors not shown here may also be provided to characterize a signal related to the driver's intent, other environmental conditions or engine operating states. The sensor connections are illustrated here as an example only. The sensors may be connected to each control unit data being exchanged between the control units.

The engine control unit and the exhaust-gas aftertreatment control unit may form one structural unit. However, these units may also be designed as two physically separate control units.

The procedure according to an exemplary embodiment of the present invention is described below using the example of a reductive catalytic converter, which is used in particular with direct-injection internal combustion engines. However, the procedure according to the present invention is not limited to this application, but instead may also be used with other internal combustion engines having an exhaust-gas aftertreatment system. It may be used with exhaust-gas aftertreatment systems in which a catalytic converter and a particle filter are combined.

On the basis of the existing sensor signals, engine control unit 175 calculates trigger signals to be sent to fuel metering system 180, which then meters the proper amount of fuel for internal combustion engine 100. During combustion nitrogen oxides may be produced in the exhaust gas. They are converted into nitrogen and water by reductive catalytic converter 115b in exhaust-gas aftertreatment system 115. Therefore, a reducing agent must be supplied to the exhaust gas upstream from the exhaust-gas aftertreatment system.

In the exemplary embodiment illustrated here, this reducing agent is supplied to the exhaust gas via actuator member 182.

The reducing agent may be ammonia, which is formed from a urea solution in hydrolytic catalytic converter 115a.

Other reducing agents may also be used as the basis for forming ammonia and/or as a substitute for ammonia. No hydrolytic catalytic converter is necessary in these cases.

Furthermore, the reducing agent may be introduced into the exhaust gas by suitable metering by actuator elements 180, which usually meter fuel to the internal combustion engine. This may be accomplished by a secondary injection a certain period of time after the actual injection. This secondary injection occurs so late that the fuel is no longer consumed by combustion.

Actuator element 182 may be situated on exhaust gas line 110. However, it may also be mounted on exhaust-gas aftertreatment system 115, in particular on hydrolytic catalytic converter 115a.

In the exemplary embodiment described below, an aqueous urea solution is supplied to the exhaust-gas aftertreatment system using actuator element 182. The aqueous urea solution is referred to below as the reducing agent.

Figure 2:
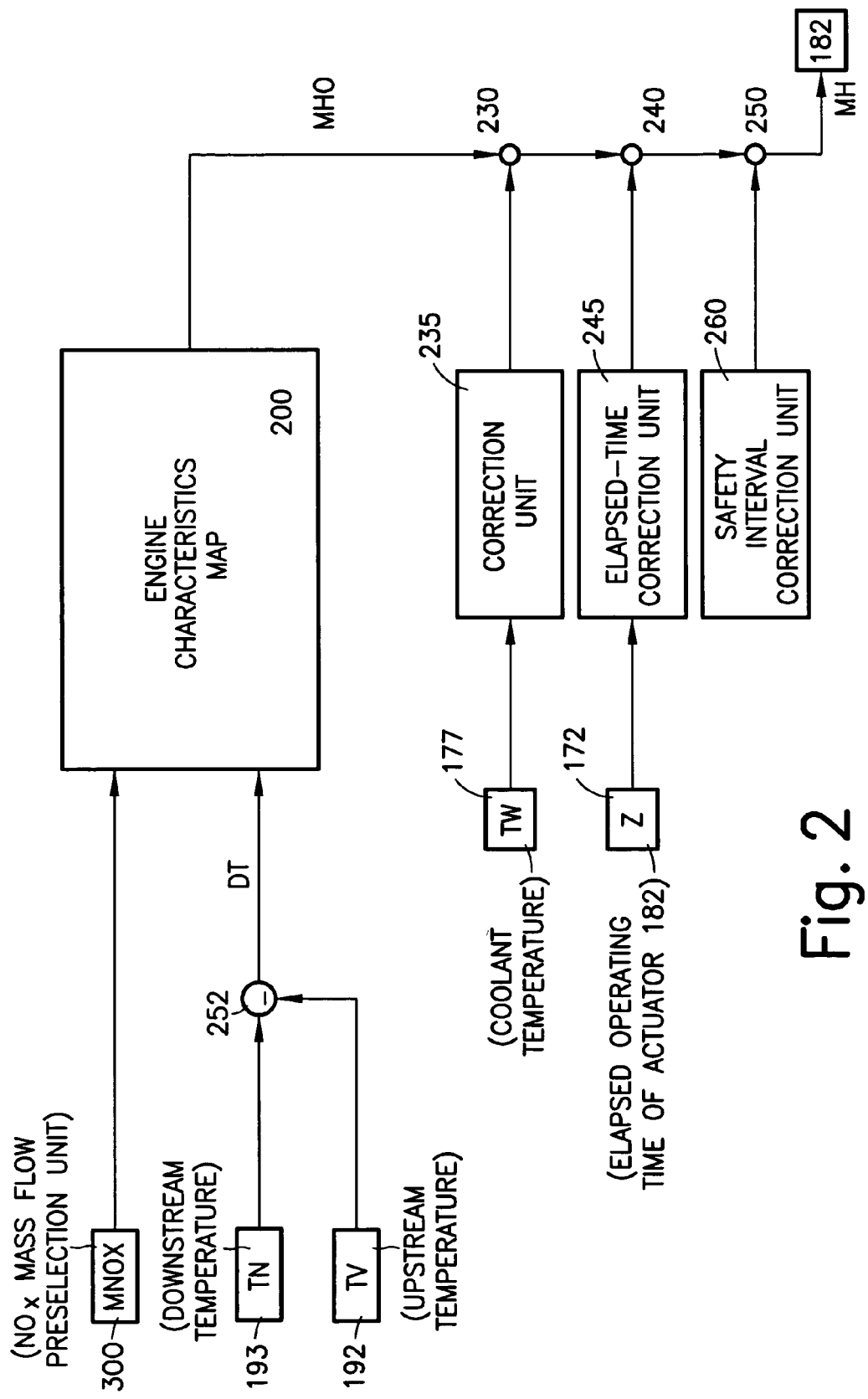
FIG. 2 shows a block diagram of an exemplary embodiment of a device and a method for determining the quantity of reducing agent supplied to the exhaust-gas aftertreatment system.

FIG. 2 shows the determination of the quantity of reducing agent MH supplied in greater detail. Elements already described in conjunction with FIG. 1 are labeled with the same reference numbers. An engine characteristics map 200 in which a base value MH0 for the quantity of reducing agent supplied is stored receives various signals, e.g., NOx mass flow MNOx, supplied by a NOx mass flow preselection unit 300, and a temperature difference DT.

Temperature difference DT characterizes the temperature difference upstream and downstream from the exhaust-gas aftertreatment system and corresponds in first approximation to the average temperature of the exhaust-gas aftertreatment system. For this purpose, the output signal of sensor 193, which detects temperature TN downstream from the exhaust-gas aftertreatment system, is sent to a node 252. Temperature TV corresponding to the temperature upstream from the exhaust-gas aftertreatment system is available at the second input of node 252.

Output signal MH0 of engine characteristics map 200 goes via a first node 230 to a second node 240 and from there to a third node 250. The output signal of node 250 is used as triggering signal MH for actuator element 182. As an alternative, the triggering signal for actuator element 182 may also be calculated based on this signal or read out of an engine characteristics map. This signal MH characterizes the quantity of reducing agent supplied to the exhaust-gas aftertreatment system.

In addition, the output signal of a first correction unit 235 which takes into account the influences of coolant temperature TW, detected by sensor 177, is applied at node 230.

The output signal of elapsed time correction unit 245, the signal pertaining to the hours of operation (elapsed time) of actuator element 182, i.e., the exhaust-gas aftertreatment system, is applied at second node 240. This signal may be available in control unit 172 and/or 175. The output signal of a safety interval correction unit 260 is applied at node 250.

The required quantity of reducing agent, i.e., the triggering signal for actuator element 182 as a function of nitrogen oxide mass flow MNOx, temperature difference DT of the exhaust gas temperatures upstream TV and downstream TN from the exhaust-gas aftertreatment system are stored in engine characteristics map(s) 200.

This stored base value MH0 is then corrected in various nodes as a function of the coolant temperature, the operating time of actuator element 182 and an interval correction 260. The determination of the quantity of reducing agent in engine characteristics map 200 is performed in the engine characteristics map on the basis of the known efficiency of the catalytic converter.

Figure 3:
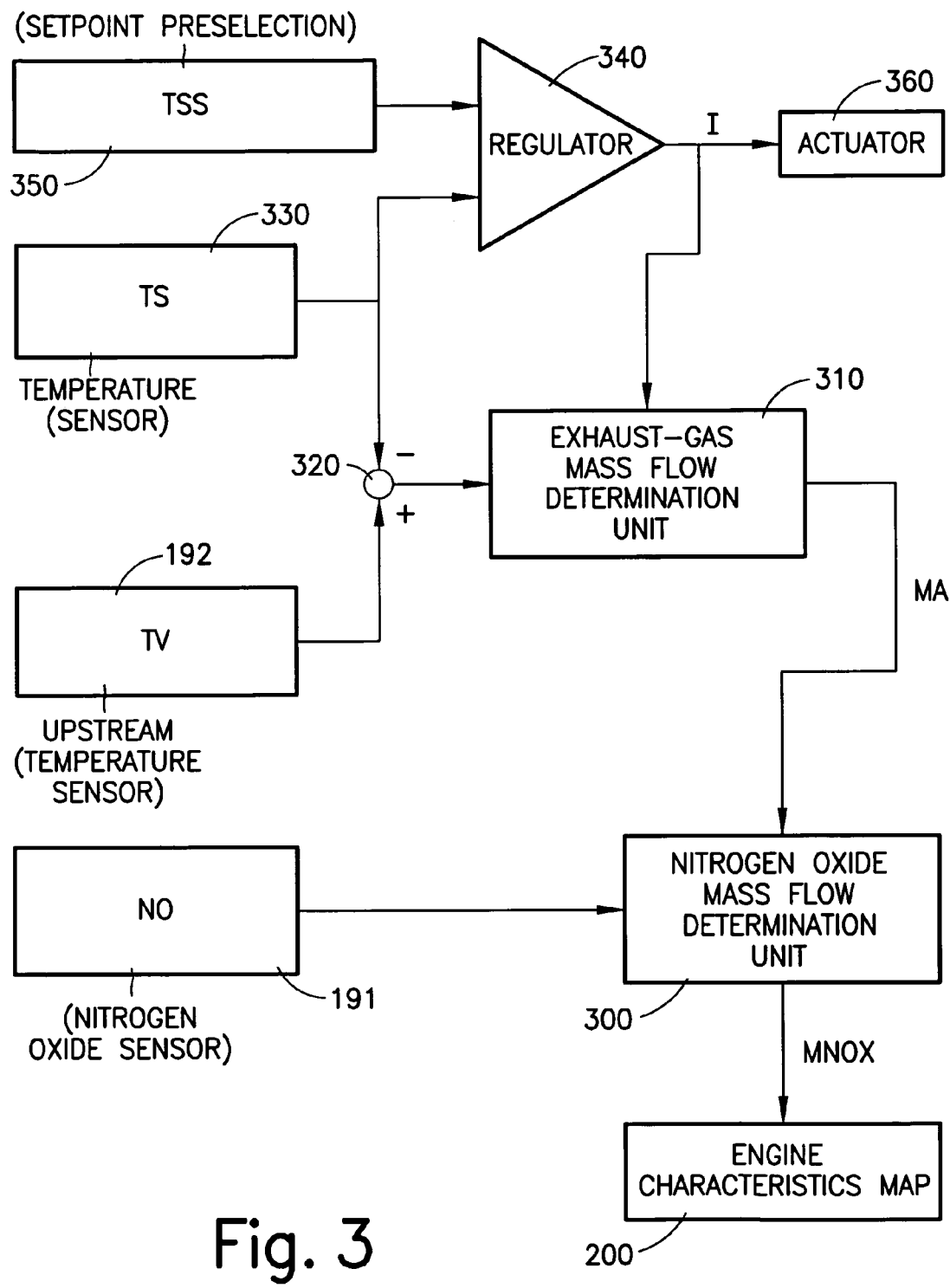
FIG. 3 shows a block diagram of an exemplary embodiment of a method and a device for determining the nitrogen oxide mass flow in an exhaust-gas aftertreatment system.

FIG. 3 shows nitrogen oxide mass flow determination unit 300 in greater detail. Output signal NO, also referred to as the second variable, characterizing the nitrogen oxide concentration in the exhaust gas, is supplied to nitrogen oxide mass flow determination unit 300. In addition, the nitrogen oxide mass flow determination unit processes a signal MA characterizing the exhaust gas mass flow. This signal is supplied by exhaust gas mass flow determination unit 310. Exhaust gas-mass flow determination unit 310 receives the output signal of a node 320 and a current signal I. Instead of current signal I, a signal characterizing the current signal may also be used.

The output signal of sensor 192 which detects exhaust gas temperature TV upstream from the exhaust-gas aftertreatment system is applied to the first input of node 320. Actual value TS of a temperature regulator is applied at the second input of node 320. The node determines the difference between these two signals. Signal TS, supplied by a sensor 330 for detecting the temperature of nitrogen oxide sensor 191, is also supplied to a regulator 340 at whose second input signal TSS is applied. Signal TSS, corresponding to the setpoint value of the temperature of nitrogen oxide sensor 191, is supplied by a setpoint preselector 350. Regulator 340 acts upon an actuator element 360, which influences the current flow through sensor 191.

Nitrogen oxide sensor 191 usually detects the nitrogen oxide emissions of the internal combustion engine. This sensor is usually heated to a constant temperature. FIG. 3 shows a regulator 340 provided for this purpose. A setpoint value TSS and an actual value TS are supplied to this regulator. Based on a comparison of these two values, regulator 340 calculates a triggering signal, in particular a current value, to trigger a corresponding actuator element 360. Then a corresponding current flow I through the sensor is set on the basis of the output signal of the regulator, resulting in sensor temperature TS matching temperature setpoint TSS.

Heat transfer from the sensor to the exhaust gas occurs as a function of the exhaust gas mass flow and the temperature difference between the sensor and the exhaust gas. This heat transfer would cool the sensor, but that is prevented by the temperature regulator. The heating of the sensor depends on the heat transfer. Current I flowing through the sensor is thus a measure of the heat transfer. According to an exemplary embodiment of the present invention, exhaust gas mass flow calculation unit 310 determines exhaust gas mass flow MA on the basis of the temperature difference between temperature TV of the exhaust gas and sensor temperature TS, which is determined by node 320, and current I, which is needed for heating the sensor to the certain temperature.

The exhaust gas mass flow cools sensor 191. The temperature regulator of the sensor counteracts this cooling by increasing current I. The quantity of heat removed from the sensor by the exhaust gas flow is equal to the additional energy that must be supplied to the sensor. This yields the following equation for calculating exhaust gas mass flow MA:

$$MA = K1 * \frac{I}{TS - TV}$$

Variable K1 is essentially a constant determined by the geometry of the exhaust gas system.

This means that an exhaust gas variable characterizing the exhaust gas mass flow is preselectable on the basis of the power consumption of a sensor.

Nitrogen oxide mass flow MNOX is calculated in nitrogen oxide mass flow calculating unit 300 on the basis of exhaust gas mass flow MA and nitrogen oxide concentration NOX in the exhaust gas as detected by sensor 191. The following equation holds:

$$MNOX = MA * NOX * K2.$$

Variable K2 is essentially a constant.

As an alternative, exhaust gas mass flow MA is determined on the basis of pressure difference DP between the inlet and the outlet of the exhaust-gas aftertreatment system. The exhaust gas mass flow is calculated according to the following equation:

$$MA = \sqrt{K3 * DP} * K4$$

Variable K3 is essentially a constant. Value P1 is the pressure upstream from the exhaust-gas aftertreatment system. Value K4 is a constant determined by the geometry of the system.

Variable K3 depends on the temperature of the exhaust gas. The accuracy of the calculation is increased by taking into account exhaust gas temperature TV upstream from the exhaust-gas aftertreatment system.

Instead of exhaust gas temperature TV upstream from the exhaust-gas aftertreatment system, other temperature values which depend on exhaust gas temperature TV may also be used. Furthermore, exhaust gas temperature TV upstream from the exhaust-gas aftertreatment system may also be calculated on the basis of other measured values.

The invention claimed is:

1. A method for controlling an exhaust-gas aftertreatment system for an internal combustion engine, the exhaust-gas aftertreatment system having at least one catalytic converter, the method comprising:
    supplying a reducing agent to the exhaust-gas aftertreatment system, and
    selecting an exhaust gas mass flow based on at least one of a pressure variable and a power consumption of a sensor;
    wherein selecting an exhaust gas mass flow includes selecting a first variable, which characterizes a nitrogen oxide mass flow in the exhaust gas upstream from the catalytic converter, based on the exhaust gas mass flow and a second variable which characterizes a nitrogen concentration in the exhaust gas upstream from the catalytic converter.

2. The method as claimed in claim 1, wherein the second variable is detected by the sensor.

3. The method as claimed in claim 1, further comprising:
    determining a quantity of reducing agent to be supplied to the exhaust-gas aftertreatment system on the basis of at least the first variable.

4. A device for controlling an exhaust-gas aftertreatment system for an internal combustion engine, the exhaust-gas aftertreatment system having at least one catalytic converter, the device comprising:
    an arrangement for supplying a reducing agent to the exhaust-gas aftertreatment system; and
    an arrangement for selecting an exhaust gas mass flow on the basis of at least one of a pressure variable and a power consumption by a sensor, wherein selecting an exhaust gas mass flow includes selecting a first variable, which characterizes a nitrogen oxide mass flow in the exhaust gas upstream from the catalytic converter, based on the exhaust gas mass flow and a second variable which characterizes a nitrogen concentration in the exhaust gas upstream from the catalytic converter.

5. A computer-readable data storage element for storing a computer program having a plurality of instruction codes executable by a computer for controlling an internal combustion engine having an exhaust-gas aftertreatment system, the instruction codes performing:

control of supplying a reducing agent to the exhaust-gas aftertreatment system, and control of selecting an exhaust gas mass flow based on at least one of a pressure variable and a power consumption of a sensor, wherein selecting an exhaust gas mass flow includes selecting a first variable, which characterizes a nitrogen oxide mass flow in the exhaust gas upstream from the catalytic converter, based on the exhaust gas mass flow and a second variable which characterizes a nitrogen concentration in the exhaust gas upstream from the catalytic converter.

6. A method for controlling an exhaust-gas aftertreatment system for an internal combustion engine, the exhaust-gas aftertreatment system having at least one catalytic converter, the method comprising:

determining an exhaust gas mass flow based on a current signal that represents a measure of the heating power of a nitrogen oxide sensor for measuring a nitrogen oxide concentration; and supplying a reducing agent into an exhaust pipe upstream of the catalytic converter, wherein the quantity of the reducing agent depends on the nitrogen oxide concentration and the exhaust gas mass flow.

7. A device for controlling an exhaust-gas aftertreatment system for an internal combustion engine, the exhaust-gas aftertreatment system having at least one catalytic converter, the device comprising:

a heated nitrogen-oxide sensor for measuring a nitrogen oxide concentration;

an arrangement for determining an exhaust gas mass flow based on a heating-current signal that represents a measure of the heating power of the nitrogen oxide sensor; and an arrangement for supplying a reducing agent into an exhaust pipe upstream of the catalytic converter, wherein the quantity of the reducing agent depends on the nitrogen oxide concentration and the exhaust gas mass flow.

* * * * *